(12) United States Patent
Nozuki (10) Patent No.: US 8,850,264 B2
(45) Date of Patent: Sep. 30, 2014

(54) INFORMATION TERMINAL AND INFORMATION PROCESSING METHOD

(75) Inventor: Yasuhiro Nozuki, Kawasaki (JP)

(73) Assignee: Fujitsu Limited, Kawasakai (JP)

( * ) Notice: Subject to any disclaimer, the term of this patent is extended or adjusted under 35 U.S.C. 154(b) by 362 days.

(21) Appl. No.: 13/166,943

(22) Filed: Jun. 23, 2011

(65) Prior Publication Data

US 2011/0320875 A1 Dec. 29, 2011

(30) Foreign Application Priority Data

Jun. 29, 2010 (JP) ................. 2010-147440

(51) Int. Cl.
*G06F 11/00* (2006.01)
*G06F 11/07* (2006.01)

(52) U.S. Cl.
CPC .......... *G06F 11/079* (2013.01); *G06F 11/0742* (2013.01)
USPC ........................................................ 714/23

(58) Field of Classification Search
USPC ........................................................ 714/23
See application file for complete search history.

(56) References Cited

U.S. PATENT DOCUMENTS

| | | | |
|---|---|---|---|
| 6,762,772 B1 | 7/2004 | Imamura et al. | |
| 7,146,534 B2 * | 12/2006 | Yamada | 714/23 |
| 7,398,423 B2 * | 7/2008 | Reaume et al. | 714/23 |
| 7,571,353 B2 * | 8/2009 | Largman et al. | 714/36 |
| 7,681,028 B2 * | 3/2010 | Stalker et al. | 713/2 |
| 7,702,950 B2 * | 4/2010 | Gatto et al. | 714/5.1 |
| 8,448,013 B2 * | 5/2013 | Clark et al. | 714/4.11 |
| 8,464,032 B2 * | 6/2013 | Henry et al. | 712/227 |
| 2003/0084276 A1 * | 5/2003 | Levidow et al. | 713/1 |
| 2006/0158518 A1 * | 7/2006 | Sakai | 348/207.2 |
| 2006/0233114 A1 * | 10/2006 | Alam et al. | 370/252 |
| 2007/0136302 A1 * | 6/2007 | Zuber | 707/10 |
| 2008/0031239 A1 * | 2/2008 | Kapoor et al. | 370/389 |
| 2008/0163001 A1 * | 7/2008 | Ko et al. | 714/36 |
| 2011/0087921 A1 * | 4/2011 | Tachibana et al. | 714/23 |

FOREIGN PATENT DOCUMENTS

| | | |
|---|---|---|
| JP | 2001-014006 A | 1/2001 |
| JP | 2004-310514 A | 11/2004 |
| JP | 2005-057347 | 3/2005 |
| JP | 2005-86749 A | 3/2005 |

OTHER PUBLICATIONS

Office Action of Japanese Patent Application No. 2010-147440 dated Jan. 14, 2014 with Partial Translation.
Japan Patent Office, Office Action, mailed Mar. 18, 2014, and issued in connection with foreign priority Japanese Patent Application No. 2010-147440.

* cited by examiner

*Primary Examiner* — Bryce Bonzo
(74) *Attorney, Agent, or Firm* — Fujitsu Patent Center (57) ABSTRACT

An information terminal includes a start processing unit of a central processing unit which executes restart processing and a notification unit which outputs reason information indicating a reason for executing the restart processing.

6 Claims, 4 Drawing Sheets

INFORMATION TERMINAL AND INFORMATION PROCESSING METHOD

CROSS-REFERENCE TO RELATED APPLICATIONS

This application is based upon and claims the benefit of priority from the prior Japanese Patent Application No. 2010-147440 filed on Jun. 29, 2010, the entire contents of which are incorporated herein by reference.

FIELD

The embodiment discussed herein relates to an information terminal and a method of processing information in an information terminal.

BACKGROUND

When a problem occurs with an information terminal, such as a mobile telephone, a PDA (Personal Digital Assistant), etc., the problem is usually solved by performing restart processing of the information terminal. At the time of the restart processing, for example, the same processing at power-on time is performed as start processing. In the start processing at power-on time, from a state of displaying nothing on a display panel of the information terminal, specific display processing is executed after initialization setting. The state of displaying nothing is a black-screen state. Accordingly, in the restart processing, display processing of a display panel is suddenly stopped to proceed to a black-screen state, and after a certain time period required for initialization setting, a standby screen, etc., is displayed. At this time, a user is not allowed to recognize that the restart processing is being automatically executed in order to recover from the problem so that the user thinks that a problem has occurred. Thus, the user sometimes feels uncomfortable or insecure.

Japanese Laid-open Patent Publication No. 2001-14006 has proposed an apparatus which displays a display screen at restart time, which has been stored in a memory, etc., on a display panel at restart processing time, and then continues restart processing so as to recover from a problem. For a display screen at restart time, for example, a menu screen, etc., that has been stored in advance is used. Alternatively, for a display screen at restart time, for example, an operation screen, etc., that has been displayed at the time of determining restart as pre-processing of the restart processing and has been stored in an external memory is used.

In the case of displaying a menu screen, etc., stored in advance is displayed as a display screen at restart time, the information terminal suddenly changes from an operation screen to a different screen. Accordingly, the user sometimes thinks that a problem beyond recognition has suddenly occurred, and thus feels uncomfortable or insecure. In the case displaying, at restart processing time, an operation screen stored in the external memory in the pre-processing of the restart processing as a display screen at restart time, it is thought that information terminal does not perform storage operation properly at problem occurrence time, and the operation screen is not properly stored in the external memory. In this case, a screen display at the time of restart processing does not become suitable, and thus the user sometimes thinks that a problem has occurred and feels uncomfortable or insecure.

SUMMARY

According to an aspect of the invention, an information terminal includes a start processing unit of a central processing unit which executes restart processing; and a notification unit which outputs reason information indicating a reason for executing the restart processing.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a description will be given of an embodiment for carrying out the present invention. In this regard, in the following description, a description will be given using a mobile telephone as an example of an information terminal. However, other various kinds of information terminals in addition to a mobile telephone may be used. Other various kinds of information terminals may include, for example, a PDA, an ultra-mobile personal computer, a notebook computer, and a desktop personal computer.

(1) Configuration of Mobile Telephone

Figure 1:
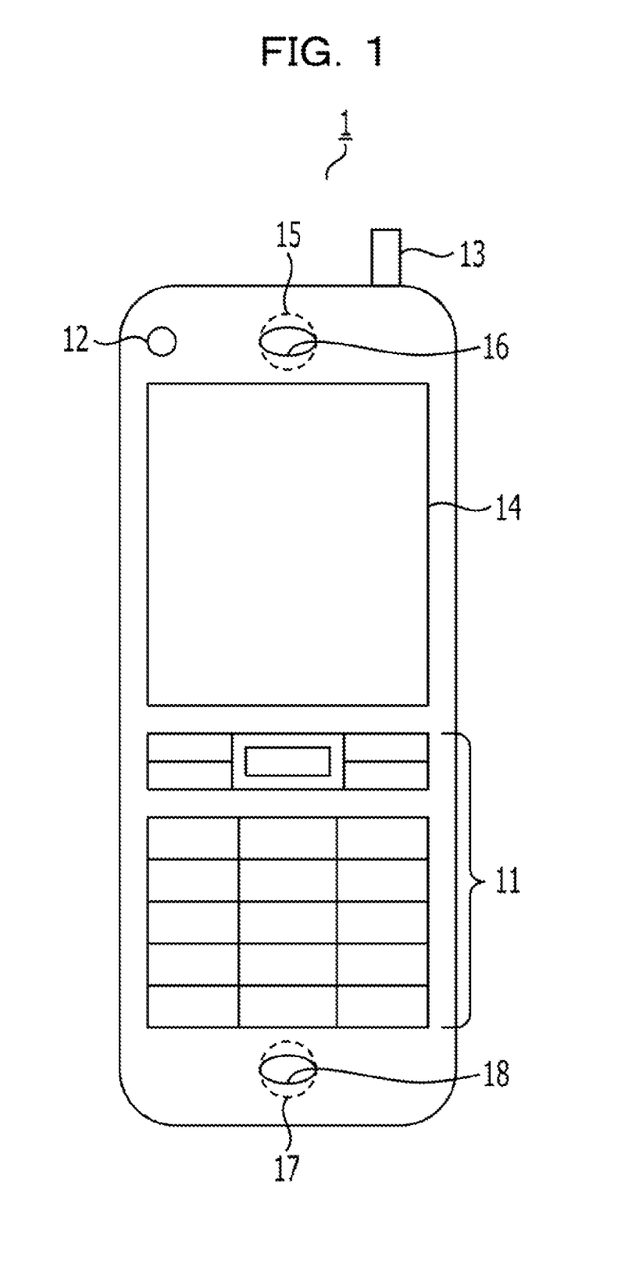
FIG. 1 is an outer view illustrating an appearance of a mobile telephone according to a present embodiment.
Figure 2:
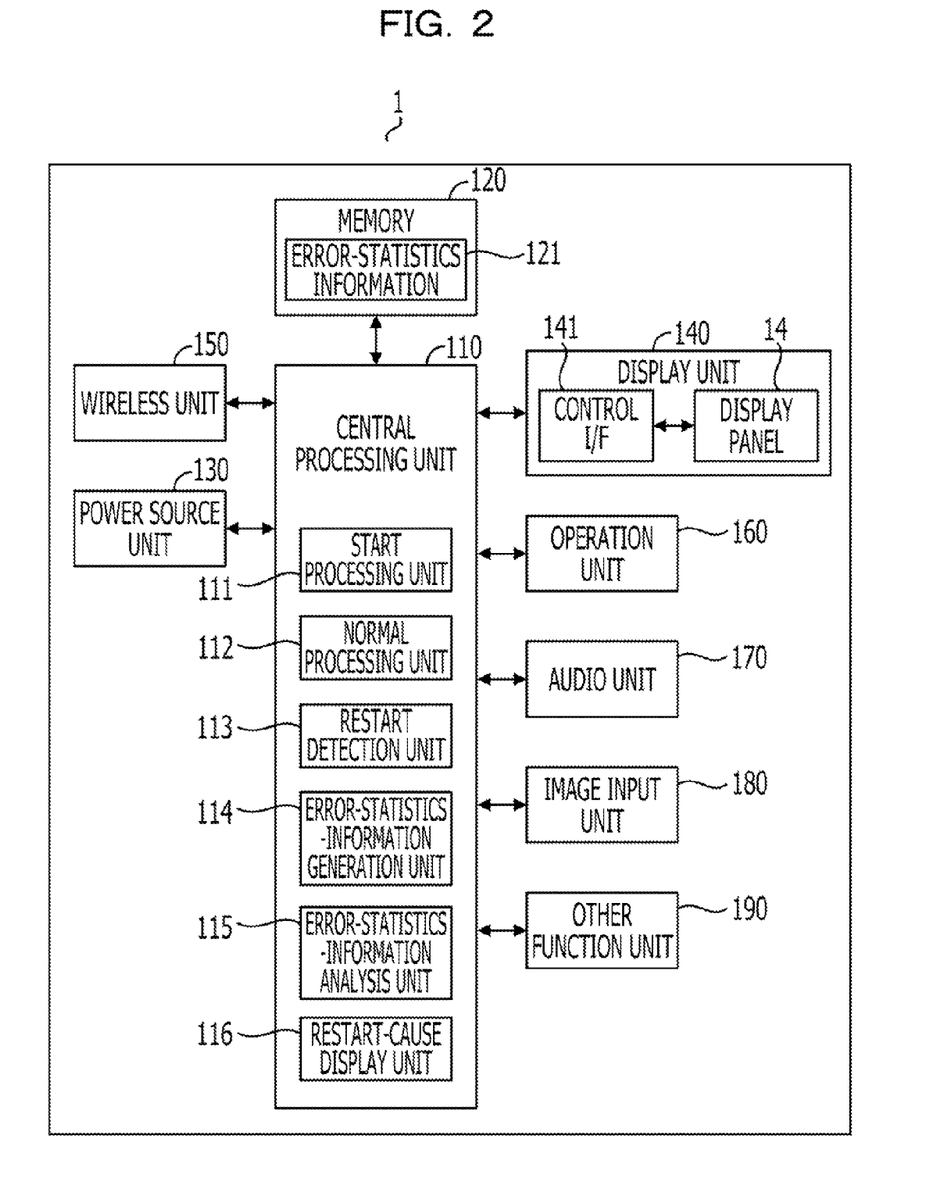
FIG. 2 is a block diagram illustrating a configuration of the mobile telephone according to the present embodiment.

A description will be given of a configuration of a mobile telephone 1 according to the present embodiment with reference to FIG. 1 and FIG. 2. FIG. 1 is an outer view illustrating an appearance of the mobile telephone 1 according to the present embodiment. FIG. 2 is a block diagram illustrating a configuration of the mobile telephone 1 according to the present embodiment. In FIG. 1 and FIG. 2, the mobile telephone 1 according to the present embodiment may suitably include the other configurations, not illustrated in the figure.

As illustrated in FIG. 1, the mobile telephone 1 is provided with a keypad 11, a camera 12, an antenna 13, a display panel 14, an ear piece 15, and a mouth piece 17. A speaker 16 is disposed inside the ear piece 15. A microphone 18 is disposed inside the mouth piece 17.

The display panel 14 includes, for example, a liquid-crystal panel, and is used for presenting information, displaying a cursor for selecting information, etc. The keypad 11 includes a plurality of key switches for inputting an operation, such as a power key for turning ON/OFF the power to the mobile telephone 1, etc. The keypad 11 is used for a user to input an operation instruction, and to input data etc., to the mobile telephone 1.

As illustrated in FIG. 2, the mobile telephone 1 includes a central processing unit 110, a memory 120, a power source unit 130, and a plurality of function units 140 to 190, each of which is an example of a "functional unit." The plurality of function units 140 to 190 includes a display unit 140, a wireless unit 150, an operation unit 160, an audio unit 170, an image input unit 180, and the other function unit 190.

The memory 120 stores transmitted and received email data, history data of received and transmitted telephone calls, captured image data, stored data, such as telephone numbers, email addresses, etc., and setting data used for various functions, such as a display function of the mobile telephone 1, etc. The setting data includes, for example, display parameters at the time of creating screens to be displayed on the display panel 14 (refer to FIG. 4A to FIG. 4E described later). The memory 120 stores programs for achieving various functions of the mobile telephone 1. The programs stored in the memory 120 are executed by the central processing unit 110 so that the various functions of the mobile telephone 1 are achieved.

The central processing unit 110 instructs operation of the function units 140 to 190 using data and programs stored in the memory 120 so as to execute various kinds of information processing for various functions, such as a display function, etc.

For example, the central processing unit 110 executes writing data to and reading data from the memory 120. For example, when a key switch of the keypad 11 is pressed, the central processing unit 110 receives an operation input signal through the operation unit 160, and executes the processing corresponding to that operation input signal using the function units 140 to 190. For example, when a key switch of the keypad 11 is pressed to input data through the operation unit 160 to the central processing unit 110, the central processing unit 110 receives the input data, and stores the input data into the memory 120. For example, the central processing unit 110 executes signal processing on the radio signal input from the wireless unit 150, performs audio and data acquisition processing, and performs audio and data transmission processing from the wireless unit 150. For example, the central processing unit 110 creates a screen displaying the display panel 14 using the data stored in the memory 120, and instructs display processing of the created screen to the display unit 140 as display control processing.

The central processing unit 110 is further provided with a start processing unit 111, a normal processing unit 112, a restart detection unit 113 as an example of a "detection unit", an error-statistics-information generation unit 114, an error-statistics-information analysis unit 115 as an example of an "analysis unit", and a restart-cause display unit 116 as an example of a "notification unit".

The start processing unit 111 executes start processing which instructs to start the function units 140 to 190. The start process is, for example, initialization setting and initial operation.

The normal processing unit 112 executes normal processing which instructs operation of the function units 140 to 190 in response to the occurrence of an operation.

The restart detection unit 113 detects a state at which the restart processing of the mobile telephone 1 is executed during normal processing. Depending on a detection result of the restart detection unit 113, the start processing unit 111 executes restart processing which instructs the function units 140 to 190 to perform initialization setting and initial operation.

The error-statistics-information generation unit 114 generates a log of an error that occurred in the mobile telephone 1. An error is sometimes referred to as a problem. The error-statistics-information generation unit 114 stores the generated log into the memory 120 as error statistics information 121, which is an example of "history information".

The log of an error that has occurred in the mobile telephone 1 includes, for example, error contents and an occurrence date and time of that error. As an example of a log of an error that occurred in the mobile telephone 1, for example, a log of an error caused by the central processing unit 110 or an error detected by the central processing unit 110 is given. The error includes, for example, abnormality of an application running on the central processing unit 110, an input/output error of data from the central processing unit 110, etc. As another example of a log of an error that occurred in the mobile telephone 1, for example, a log of an error caused by the memory 120 or an error detected by the memory 120 is given. The error includes, for example, exhaustion of a work memory, memory input/output abnormality, data corruption, etc. As another example of a log of an error that occurred in the mobile telephone 1, for example, a log of an error caused by the power source unit 130 or an error detected by the power source unit 130 is given. The error includes, for example, power disconnection, power short circuit, temperature abnormality of the power source unit 130, etc. As another example of a log of an error that occurred in the mobile telephone 1, for example, a log of an error caused by the display unit 140 or an error detected by the display unit 140 is given. The error includes, for example, display abnormality, temperature abnormality of the display unit 140, etc. As another example of a log of an error that occurred in the mobile telephone 1, for example, a log of an error caused by the wireless unit 150 or an error detected by the wireless unit 150 is given. The error includes, for example, radio-wave output abnormality, radio-wave receiving abnormality, temperature abnormality of the wireless unit 150, etc. As another example of a log of an error that occurred in the mobile telephone 1, for example, a log of an error caused by the operation unit 160 or an error detected by the operation unit 160 is given. The error includes, for example, operation incapability abnormality, input abnormality of an operation input signal, temperature abnormality of the operation unit 160, etc. As another example of a log of an error that occurred in the mobile telephone 1, for example, a log of an error caused by the audio unit 170 or an error detected by the audio unit 170 is given. The error includes, for example, audio output abnormality, circuit disconnection, temperature abnormality of the audio unit 170, etc. As another example of a log of an error that occurred in the mobile telephone 1, for example, a log of an error caused by the image input unit 180 or an error detected by the image input unit 180 is given. The error includes, for example, shooting incapability abnormality, input/output abnormality of an image signal, temperature abnormality of the image input unit 180, etc. As another example of a log of an error that occurred in the mobile telephone 1, for example, a log of an error caused by the other function unit 190 or an error detected by the other function unit 190 is given. The error includes, for example, input/output abnormality or operation abnormality of the other function unit 190, abnormality of the state of the mobile telephone 1 detected by the other function unit 190, etc. More specifically, for example, in the case where the other function unit 190 includes an acceleration sensor, if a movement acceleration of the mobile telephone 1 detected by the acceleration sensor exceeds a predetermined threshold value, a log of en error stating falling of the mobile telephone 1 or giving excessive shock may be generated as the error statistics information 121.

The error-statistics-information generation unit 114 may generate a log of any event that occurred in the mobile telephone 1 and a log of any processing performed by the mobile telephone 1 in addition to a log of an error that occurred in the mobile telephone 1. These logs may also be stored in the memory 120 as the error statistics information 121.

When the restart processing of the mobile telephone 1 is executed, the error-statistics-information analysis unit 115 analyzes the error statistics information 121 stored in the memory 120 so as to analyze a cause of the restart processing that has been executed. To put it in another way, the cause is a reason for executing the restart processing, which is called a "cause of restart" hereinafter. The error-statistics-information analysis unit 115 transfers the analyzed cause of the restart to the restart-cause display unit 116. A detailed description will be given later of analysis operation performed by the error-statistics-information analysis unit 115 (refer to FIG. 3).

The restart-cause display unit 116 outputs a display control signal to the display unit 140 so as to display a screen indicating that the restart processing of the mobile telephone 1 is being executed by the cause of the restart analyzed by the error-statistics-information analysis unit 115 to the display panel 14. As a result, the display unit 140 displays the screen indicating that the restart processing of the mobile telephone 1 is being executed by the cause of the restart on the display panel 14.

The power source unit 130 includes a battery, and a circuit that controls a power-source circuit generating a power-source voltage from the battery to supply the power-source voltage to each unit of the circuit of the mobile telephone 1. When the central processing unit 110 instructs the power source unit 130 to perform power-on processing, the power source unit 130 supplies the power-source voltage to each unit of the circuit, and when the central processing unit 110 instructs the power source unit 130 to perform power-off processing, the power source unit 130 stops supplying the power-source voltage to all the circuits of the mobile telephone 1.

The display unit 140 has a function of displaying a screen on the display panel 14, and a function of maintaining the display of the screen. The display unit 140 includes a control I/F 141, which is an interface circuit with the central processing unit 110, and the display panel 14. The display panel 14 displays a screen that is input through the control I/F 141.

The wireless unit 150 includes an antenna 13, and a circuit that transmits radio signals to and receives radio signals from a radio base station through the antenna 13.

The operation unit 160 includes a keypad 11, and an interface circuit that receives ON/OFF information of a key switch of the keypad 11, and inputs the key information of the operated key switch into the central processing unit 110.

The audio unit 170 includes a speaker 16, a microphone 18, and interface circuits of the speaker 16 and the microphone 18, respectively. At the time of telephone calls, the audio unit 170 performs processing for obtaining audio data that is input through the microphone 18, and outputting the audio data to the central processing unit 110, and processing for outputting data instructed from the central processing unit 110 as sound through the speaker 16.

The image input unit 180 includes a camera 12, and an interface circuit that sets and controls a shutter, a zoom, an electronic flash, etc., of the camera 12, and inputs an imaging signal from the camera 12 to the central processing unit 110 as image data.

The other function unit 190 is a function unit that performs functions included in the mobile telephone 1 in addition to the above. As the other function unit 190, an example is given of a function unit that operates, for example, a motor for vibrating the mobile telephone 1, a biometric authentication sensor, an acceleration sensor detecting a movement acceleration of the mobile telephone 1, a circuit for infrared data communication, etc.

(2) Operation of Mobile Telephone

Figure 3:
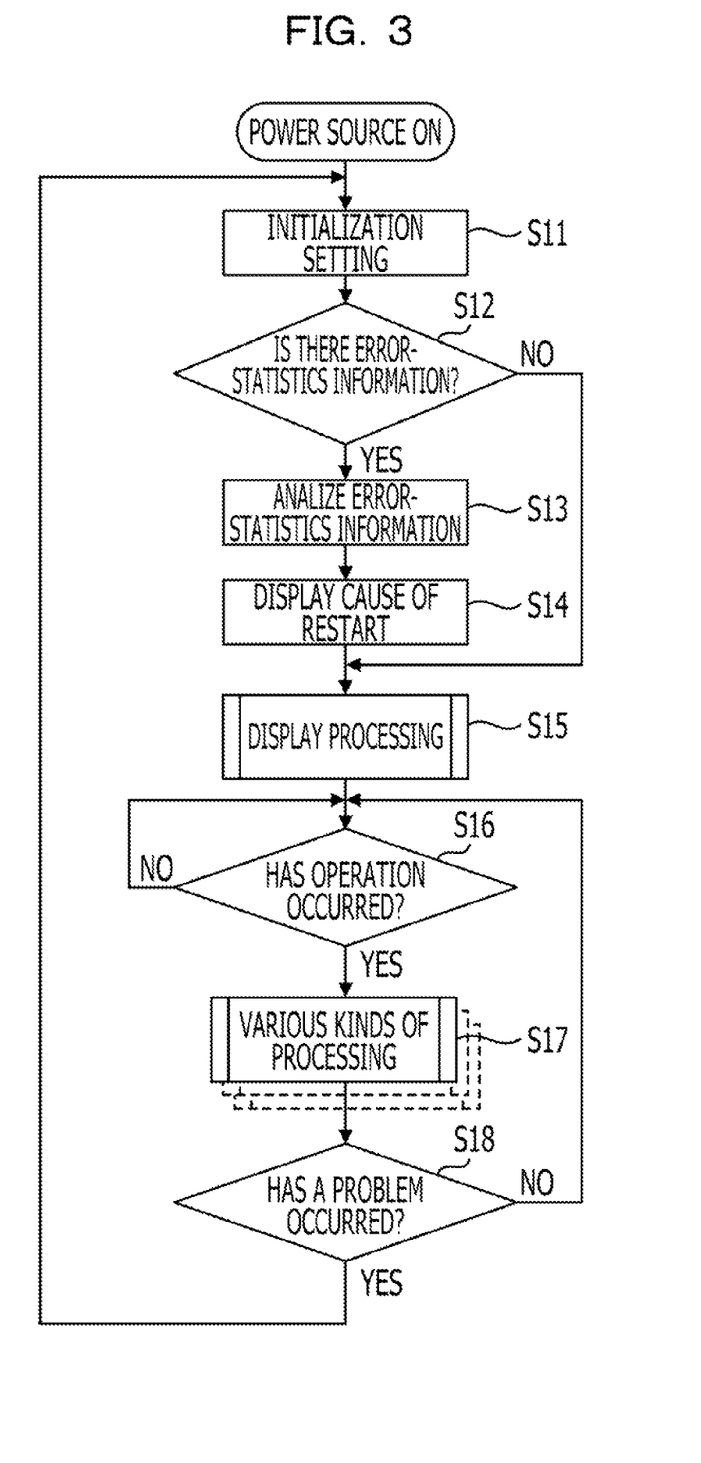
FIG. 3 is a flowchart illustrating an operation flow of the present embodiment.

A description will be given of operation of a mobile telephone 1 according to the present embodiment with reference to FIG. 3 and FIGS. 4A to 4E. FIG. 3 is a flowchart illustrating an operation flow of the present embodiment. FIG. 4A to FIG. 4E are plan views illustrating examples of screens of the mobile telephone 1 according to the present embodiment.

Figure 4A:
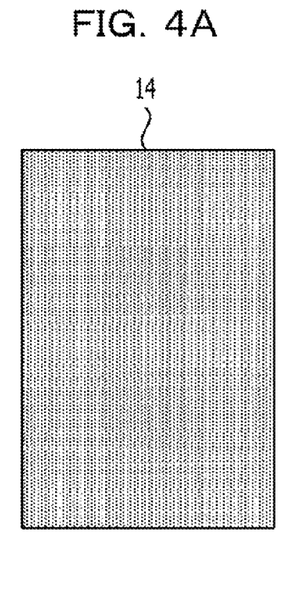
FIG. 4A to FIG. 4E are plan views illustrating examples of screens of the mobile telephone according to the present embodiment.

First, a description will be given of start processing at power-on time. In a power-off state, when the power key of the keypad 11 is pressed, power is supplied to the central processing unit 110 and the power source unit 130, and a power-on signal is input into the central processing unit 110 through the operation unit 160. When the central processing unit 110 receives the power-on signal, the central processing unit 110 instructs the power source unit 130 to perform power-on processing. When the power source unit 130 receives the instruction from the central processing unit 110, the power source unit 130 performs the power-on processing, and supplies power-source voltage to the function units 140 to 190. When the power is turned on, an internal reset signal continues in each circuit unit of the mobile telephone 1, and then after passage of a predetermined period of time, the internal reset signal is canceled, and thus the mobile telephone 1 goes into a control acceptable state. At this time, the display of the display panel 14 is, for example, a black screen state (FIG. 4A).

Next, the start processing unit 111 included in the central processing unit 110 performs start processing of the function units 140 to 190. That is to say, the start processing unit 111 instructs the function units 140 to 190 to carry out initialization setting (step S11). Specifically, the start processing unit 111 reads individual initialization setting parameters of the function units 140 to 190 from the memory 120, and notifies the read initialization setting parameters to the function units 140 to 190, respectively, and instructs to carry out the settings. At this time, the display of the display panel 14 is, for example, a black screen state (FIG. 4A).

When the start processing of the mobile telephone 1 is performed at power-on time, for example, when the start processing, other than the restart processing, of the mobile telephone 1 is performed, the error statistics information 121 has not been stored in the memory 120 (step S12: No). Accordingly, when the start processing of the mobile telephone 1 is performed at power-on time, operation of step S13 and step S14 may not be performed.

Figure 4B:
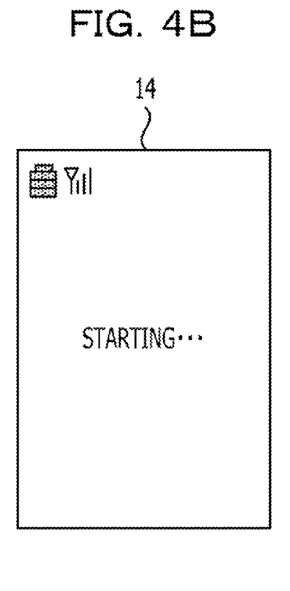
Figure 4C:
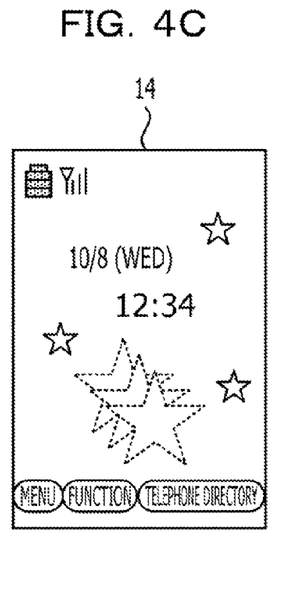

The start processing unit 111 included in the central processing unit 110 instructs the display unit 140 to perform initial operation or initial display processing (step S15). Specifically, as the initial display processing, the start processing unit 111 reads a start screen from the memory 120, and instructs the display unit 140 to perform display processing of the start screen. The display panel 14 displays the start screen (FIG. 4B). By the display of the start screen, the start processing of the mobile telephone 1 is notified to the user. When the start processing is completed, the start processing unit 111 reads a standby screen from the memory 120, and instructs the display unit 140 to perform display processing of the standby screen. The display panel 14 displays the standby screen in place of the start screen (FIG. 4C). Until the start processing is completed, the start screen is displayed on the display panel 14, and when the start processing is completed, the standby screen is displayed on the display panel 14.

The central processing unit 11 may instruct the function units 150 to 190 to perform initial operation or initial function processing (step S15). As the initial function processing, for example, the central processing unit 110 may output a startup sound to the speaker 16 through the audio unit 170 to notify the start processing of the mobile telephone 1 to the user.

By the above, the start processing of the mobile telephone 1 at power-on time is terminated, and the normal processing is performed subsequently. At the time of transition from the start processing to the normal processing, the display panel 14 displays, for example, the standby screen (FIG. 4C).

In the normal processing, the central processing unit 110 determines whether an operation has occurred or not (step S16). When, for example, the user operates the key switch of the keypad 11 to input an operation input signal through the operation unit 160, the central processing unit 110 determines that the corresponding operation has occurred.

As a determination result of step S16, if determined that an operation has not occurred (step S16: No), the central processing unit 110 repeats the operation of step S16 periodically or at any timing, and waits for the occurrence of operation. The display panel 14 continues to display, for example, the standby screen (FIG. 4C).

Figure 4D:
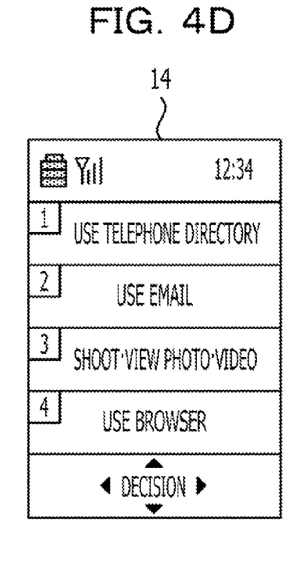

On the other hand, as a determination result of step S16, if determined that an operation has occurred (step S16: Yes), the central processing unit 110 identifies one of the function units 140 to 190 related the operation, reads necessary data from the memory 120, and instructs the one of the function units 140 to 190 to operate (step S17). For example, if the operation that has occurred is related to the display unit 140, the normal processing unit 112 creates a screen to be displayed on the display panel 14 using the data read from the memory 120, notifies the created screen to the display unit 140, and instructs to perform various kinds of display processing. The display panel 14 displays the notified screen. More specifically, for example, if an operation for selecting a menu has occurred, the normal processing unit 112 creates a menu screen, and the display panel 14 displays the menu screen (FIG. 4D). Alternatively, if the operation that has occurred is related to one of the function units 150 to 190, the normal processing unit 112 notifies the read data to the related one of the function units 150 to 190, and instructs to operate. The one of the function units 150 to 190 executes various kinds of processing by receiving the instruction.

Following, in parallel with, or at about the same time, the operation up to step S17, the restart detection unit 113 monitors internal operation of the mobile telephone 1, and determines whether an error or a problem, etc., has occurred (step S18). More specifically, the restart detection unit 113 determines whether an error that may be solved by the restart processing or an error that is preferable to be solved by performing the restart processing, etc., has occurred (step S18).

In parallel with the operation from step S11 to step S18, the error-statistics-information generation unit 114 generates a log of the error that occurred in the mobile telephone 1 or a log of an event related to the problem, and stores the generated log into the memory 120 as the error statistics information 121.

As a result of the determination in step S18, if determined that no error has occurred (step S18: No), the normal processing from step S16 to step S18 is repeated.

On the other hand, as a result of the determination in step S18, if determined that an error has occurred step S18 (step S18: Yes), the restart processing of the mobile telephone 1 is performed. That is to say, the operation of the mobile telephone 1 returns to step S11, and the start processing unit 111 instructs the function units 140 to 190 to perform the initialization setting (step S11).

At the time of the restart processing, the error statistics information 121 is stored in the memory 120 (step S12:Yes). Accordingly, at the time of the restart processing, following, in parallel with, or at about the same time, the initialization setting of step S11, the operations of step S13 and step S14 are performed.

Specifically, the error-statistics-information analysis unit 115 analyzes the error statistics information 121 stored in the memory 120 so as to analyze the cause of the restart (step S13). As an example of the analysis of the cause of the restart, the following example is given. For example, the error-statistics-information analysis unit 115 may analyze that an error indicating a latest log among the error logs included in the error statistics information 121 is the cause of the restart. Alternatively, for example, the error-statistics-information analysis unit 115 may analyze that an error that occurred immediately before the determination of executing the restart processing among the error logs included in the error statistics information 121 is the cause of the restart. Alternatively, for example, the error-statistics-information analysis unit 115 may analyze that a latest error that occurred at a point in time of the determination of the occurrence of an error in step S18 among the error logs included in the error statistics information 121 is the cause of the restart. Alternatively, for example, the error-statistics-information analysis unit 115 may analyze the cause of restart using any algorithm or program that is capable of identifying or extracting the cause of the restart from the error statistics information 121.

Figure 4E:
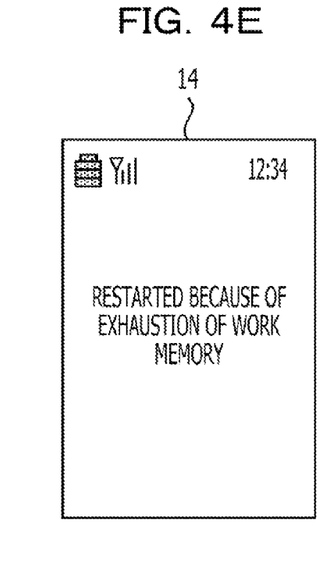

The restart-cause display unit 116 outputs a display control signal to the display unit 140 so as to display a screen indicating that the restart processing of the mobile telephone 1 is being executed because of the cause of the restart analyzed by the error-statistics-information analysis unit 115 on the display panel 14. The display unit 140 displays a screen indicating that the restart processing of the mobile telephone 1 is being executed by the cause of the restart on the display panel 14 (step S14 and FIG. 4E). FIG. 4E illustrates an example of display in the case where the cause of the restart is "exhaustion of work memory", that is to say, an example of a screen indicating that the restart processing of the mobile telephone 1 because of the exhaustion of work memory.

After that, the start processing unit 111 instructs the function units 140 to 190 to perform initial operation (the initial display processing or the initial function processing)(step S15). By the above, the restart processing at the time of occurrence of an error in the mobile telephone 1 is terminated, and the normal processing is performed.

As described above, by the mobile telephone 1 according to the present embodiment, when the restart processing of the mobile telephone 1 is executed, a screen illustrating the cause of the restart is displayed on the display panel 14. Accordingly, it is possible for the user to easily recognize that the restart processing of the mobile telephone 1 is being executed by the displayed cause of the restart. Thereby, it is possible to substantially eliminate or reduce a sense of discomfort or insecurity felt by the user at the time when the restart processing is executed.

By the mobile telephone 1 according to the present embodiment, it is possible for an existing mobile telephone to perform the above-described operation by adding a modification to the operation of the central processing unit 110. Accordingly, it is possible to achieve the mobile telephone 1 according to the present embodiment without an increase in cost and size that is caused by adding a physical circuit or apparatus.

By a mobile telephone 1 according to the present embodiment, it is possible for the mobile telephone 1 itself to analyze the cause of the restart on the basis of the error statistics information 121 stored in the memory 120. Accordingly, it is possible for a mobile telephone 1 according to the present embodiment to analyze the cause of the restart more reliably.

By the mobile telephone 1 according to the present embodiment, in addition to a log of errors that occurred in the mobile telephone 1, it is possible to generate and store a log of any event that occurred in the mobile telephone 1, and a log of any processing performed by the mobile telephone 1 as the error statistics information 121. Thereby, it is sometimes possible for the mobile telephone 1 according to the present embodiment to analyze the cause of the restart more precisely or correctly. However, an error log may be generated and stored as the error statistics information 121 in consideration of the fact that the restart processing of the mobile telephone 1 is often executed in the case where any error has occurred in the mobile telephone 1. To put it in another way, it is possible not to create and store a log of any event that occurred in the mobile telephone 1 and a log of any processing performed by the mobile telephone 1 as the error statistics information 121. Thereby, it is possible to reduce processing load of the central processing unit 110 that is necessary for generating and storing the error statistics information 121, and to reduce the size of the error statistics information 121.

By the mobile telephone 1 according to the present embodiment, an error indicated by a latest log having a high possibility of being the cause for executing the restart processing or the log that is immediately before executing the restart processing is analyzed as the cause of the restart among the error log indicated by the error statistics information 121 stored in the memory 120. Accordingly, it is possible for the mobile telephone 1 according to the present embodiment to reduce the processing load necessary for analyzing the cause of the restart, and at substantially the same time, to reliably identify the cause of the restart. In this regard, the error statistics information 121 may not store all the error logs in consideration of the fact that an error indicated by the latest log or the log that is immediately before executing the restart processing has a high possibility of being the cause for executing the restart processing among the error log indicated by the error statistics information 121 stored in the memory 120. Specifically, the error statistics information 121 may store one latest error log or a few error logs. Thereby, it is possible to reduce the size of the error statistics information 121.

By the mobile telephone 1 according to the present embodiment, the cause of the restart is displayed on the display panel 14 so that it is possible to notify the user that the restart processing of the mobile telephone 1 is executed by that cause of the restart. Accordingly, it is possible for the user to relatively easily recognize the cause of the restart processing of the mobile telephone 1 being executed. However, the cause of the restart may be notified to the user in the other manner in addition to or in place of the display of the cause of the restart on the display panel 14. The other manner includes, for example, by a sound from the speaker 16, by using a vibration of the mobile telephone 1, etc.

By the mobile telephone 1 according to the present embodiment, the restart processing is executed, and then the cause of the restart is analyzed and displayed. Alternatively, by the mobile telephone 1 according to the present embodiment, the initialization setting is carried out, and then the cause of the restart is analyzed and displayed. Accordingly, in the mobile telephone 1 according to the present embodiment, after an error is solved by the restart processing, the cause of restart is analyzed and displayed. Accordingly, it is possible for the mobile telephone 1 to reliably perform the analysis and the display of the cause of the restart. However, in the mobile telephone 1 according to the present embodiment, the analysis and the display of the cause of the restart may be performed before the restart processing is executed, or while the restart processing is being executed. Alternatively, in the mobile telephone 1 according to the present embodiment, before the initialization setting is carried out or while the initialization setting is being executed, the analysis and the display of the cause of the restart may be performed. Thereby, the display timing of the cause of the restart is set earlier, and thus it is possible to further substantially eliminate or reduce a sense of discomfort or insecurity felt by the user.

The present invention is not limited to the above-described embodiment. It is to be understood that various changes may be made insofar as they are within the scope of the appended claims and the entire specification, and without departing from the sprit and scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. An information terminal comprising:
   a memory; and
   a processor coupled to the memory and configured to execute a process, the process includes
   detecting an error caused by or occurring in the information terminal,
   storing, in the memory, an error log of the error,
   initiating a restart operation, including a powering off phase and powering on phase, of the information terminal,
   searching, during the powering on phase of the restart operation, the memory for an error log,
   selecting an error log, and
   displaying, during the powering on phase of the restart operation, a message associated with the selected error log to indicate a reason for initiating the restart operation of the information terminal.

2. The information terminal according to claim 1, wherein the memory device is configured to store a plurality of error logs and selecting an error log further comprises selecting an error log stored in the memory for the shortest period of time.

3. The information terminal according to claim 1, wherein the process further includes resetting, during the powering on phase of the restart operation, parameters of the plurality of functional devices based on parameters stored in the memory.

4. A method of processing information in an information terminal, the method comprising:
   detecting, by a processor, an error caused by or occurring in the information terminal;
   storing, by the processor, in a memory, an error log of the error,
   initiating, by the processor, a restart operation, including a powering off phase and powering on phase, of the information terminal,
   searching, by the processor, during the powering on phase of the restart operation, the memory for an error log,
   selecting, by the processor, an error log, and
   displaying, during the powering on phase of the restart operation, a message associated with the selected error log to indicate a reason for initiating the restart operation of the information terminal displaying, by the processor, during the powering on phase of the restart operation, a message associated with the selected error log to indicate a reason for initiating the restart operation of the information terminal.

5. The method according to claim 4, further comprising:
resetting, during the powering on phase of the restart operation, parameters of the plurality of functional devices based on parameters stored in the memory.

6. The method according to claim 4, wherein the memory is configured to store a plurality of error logs and selecting an error log further comprises selecting an error log stored in the memory for the shortest period of time.

\* \* \* \* \*